United States Patent
McGrath et al.

(10) Patent No.: US 10,088,142 B1
(45) Date of Patent: Oct. 2, 2018

(54) LED LIGHT TUBE

(71) Applicant: LEDdynamics, Randolph, VT (US)

(72) Inventors: William Richard McGrath, Randolph, VT (US); Oliver Alexander Piluski, Randolph, VT (US); Daniel Miller Poitrast, Randolph, VT (US); Thomas George Ference, Essex Junction, VT (US)

(73) Assignee: LEDdynamics, Inc., Randolph, VT (US)

( * ) Notice: Subject to any disclaimer, the term of this patent is extended or adjusted under 35 U.S.C. 154(b) by 14 days.

(21) Appl. No.: 15/206,472

(22) Filed: Jul. 11, 2016

(51) Int. Cl.
| | |
|---|---|
| *F21V 23/02* | (2006.01) |
| *F21V 31/00* | (2006.01) |
| *F21V 3/02* | (2006.01) |
| *F21K 9/272* | (2016.01) |
| *F21K 9/278* | (2016.01) |
| *F21V 15/015* | (2006.01) |
| *F21V 23/06* | (2006.01) |
| *F21V 19/00* | (2006.01) |
| *F21K 9/275* | (2016.01) |
| *F21Y 115/10* | (2016.01) |
| *F21Y 107/30* | (2016.01) |

(52) U.S. Cl.
CPC ............ *F21V 31/005* (2013.01); *F21K 9/272* (2016.08); *F21K 9/275* (2016.08); *F21K 9/278* (2016.08); *F21V 3/02* (2013.01); *F21V 15/015* (2013.01); *F21V 19/003* (2013.01); *F21V 23/02* (2013.01); *F21V 23/06* (2013.01); *F21Y 2107/30* (2016.08); *F21Y 2115/10* (2016.08)

(58) Field of Classification Search
CPC ........ F21K 9/272; F21K 9/275; F21V 31/005; F21V 3/02
USPC .......................................................... 362/221
See application file for complete search history.

(56) References Cited

U.S. PATENT DOCUMENTS

| 8,444,292 B2 * | 5/2013 | Ivey ........................ B29C 39/10 |
| | | 156/60 |
| 9,310,067 B2 * | 4/2016 | Abernethy .............. F21L 14/02 |
| 9,777,891 B2 * | 10/2017 | Kawabata ................. F21K 9/61 |

(Continued)

OTHER PUBLICATIONS

"Using LEDs in a bridge rectifier circuit", https://electronics.stackexchange.com/questions/47226/using-leds-in-a-bridge-rectifier-circuit, Stack xchange: ELectrical Engineering, Nov. 5, 2012.*

(Continued)

*Primary Examiner* — Karabi Guharay
*Assistant Examiner* — Matthew Peerce
(74) *Attorney, Agent, or Firm* — Thomas G. Ference

(57) ABSTRACT

An illumination device used to replace fluorescent light tubes. The illumination device comprises an LED light strip, a diffusion tube surrounding the LED light strip, and an end cap mounted on each end of the tube. Electrical connectors integrated with the end caps and make electrical connection with the LED light strip. The device may be hermetically sealed, use LED's to rectify the current, have a filament simulator with or without a visual indicator, two-sided or multi-sided light strips, light diffusing end caps and be filled with a life-extending gas. The illumination device results in an LED light tube with improved lighting uniformity, reduced energy consumption, improved ease of use and longer operating life.

22 Claims, 12 Drawing Sheets

(56) References Cited

U.S. PATENT DOCUMENTS

2012/0212951 A1\* 8/2012 Lai .................. F21V 23/002
                                            362/218
2017/0051895 A1\* 2/2017 Gielen ................ F21V 3/00
2017/0138574 A1\* 5/2017 Garcia ............... F21V 15/04
2017/0268730 A1\* 9/2017 Cai .................. F21K 9/275

OTHER PUBLICATIONS

Wikipedia, "Ultrasonic Welding", https://en.wikipedia.org/wiki/Ultrasonic_welding.\*

\* cited by examiner

LED LIGHT TUBE

FIELD

This invention generally relates to LED light tubes that are used as replacements for fluorescent light tubes. More specifically, it relates to a hermetically sealed LED light tube with improved light uniformity, less energy consumption, extended life and better ease of use.

BACKGROUND

Billions of fluorescent tubes in ballasting fixtures are installed around the world. With the emergence of LED (Light Emitting Diode) technology fluorescent tubes are quickly becoming antiquated. A major technological advance was made to replace these fluorescent tubes when it was discovered an LED tube could emulate a fluorescent tube and be powered by the pre-existing ballast. The "ballast compatible" LED tube saves time, money and power for the end-user by still using previously installed fixtures and ballasts.

Replacing fluorescent tubes with ballast compatible LED tubes poses some new issues given their long lifetime of potentially 20-years or more. In some use environments, such as subways or industrial environments, these light tubes are subjected to extreme humidity and contaminating environments. These environments may not have been a problem with fluorescent tubes, because they needed to be replaced usually each year. However, now with the LED light tube in place for potentially 20-years or longer within these environments, contaminates and moisture can degrade internal components if the tube is not sealed properly. Also, years of contaminate buildup may deposit on the outside of the tube degrading light output and require periodic washing. Having a hermetically sealed LED light tube would be of benefit since washing a non-hermetically sealed tube may destroy it.

Many current replacement LED tubes have end caps that are typically larger in diameter than the tube. These end caps are also fastened by screws and clips. Therefore, these tubes do not ideally fit the form factor of the fluorescent tube, nor do they provide an adequate seal from the environment for their long usage lifetime. Improving the form factor and seal would be of benefit.

Lighting uniformity is an issue with LED light tubes. Fluorescent tubes by nature tend to provide uniform output as the excited gas atoms naturally distribute light evenly in all directions. However, LED light tubes consist of a limited number of discrete light emitting elements with limited angles of light emission. Replicating or even improving upon the uniform lighting of fluorescent tubes would further benefit the acceptance of LED tubes as replacements for fluorescent tubes.

Ballast compatibility is also an issue in some replacement situations. The new LED replacement tube needs to accommodate to the type of ballast present and produce optimum light output for that ballast.

The present invention aims to provide an LED light tube that improves upon the currently unresolved issues described above.

SUMMARY

In one implementation, the present disclosure is directed to an illumination device that is hermetically sealed. The device is comprised of a light strip and a diffusion tube having a tube length and distal ends. The diffusion tube surrounds the light strip. The device also is comprised of an end cap mounted to each distal end. Each end cap has an electrical connector with each electrical connector connected to the light strip. Each end cap is bonded to the diffusion tube forming a hermetic seal with said diffusion tube.

In another implementation, the present disclosure is directed to an illumination device that provides 360-degree illumination. The device is comprised of three or more LED light strips mounted adjacent to each other to form an LED polygon. A diffusion tube having a length and distal ends surrounds the LED light strip. The device is also comprised of an end cap mounted to each distal end. Each end cap has an electrical connector with each electrical connector connected to the LED polygon. The LED polygon provides 360-degree uniform light emission through the diffusion tube along the tube length. The end caps may also be light diffusion end caps.

In yet another implementation, the present disclosure is directed to a device that interfaces with existing fluorescent light ballasts to redirect the power originally intended for the filaments of the fluorescent lamp into LED light. The device is comprised of an LED light strip. A filament simulator is interfaced with the LED light strip. A diffusion tube having a tube length and distal ends surrounds the LED light strip. The device is also comprised of an end cap mounted to each distal end. Each end cap has an electrical connector with each electrical connector connected to the LED light strip. The filament simulator utilizes the redirected ballast power to generate LED light. The device may also provide a visual indication of compatibility between the illumination device and the ballast.

In still another implementation, the present disclosure is directed to a method for hermetically sealing a light tube. The method comprises first providing a light strip with electrical leads extending from a connection end, a diffusion tube with distal ends, and an end cap having one or more pins with through holes. The method involves inserting the light strip into the diffusion tube with the electrical leads extending from the diffusion tube. The method further involves positioning the end cap to interface with the diffusion tube so that the electrical leads extend freely through the pin through holes. The method then involves sonically welding the end cap to the diffusion tube to create a hermetic seal. Finally, the method involves making electrical connections between the pins and the electrical leads.

In still yet another implementation, the present disclosure is directed to an illumination device with an extended life over standard LED light tubes. The device is comprised of an LED light strip. A diffusion tube having a tube length and distal ends surrounds the LED light strip. The device is also comprised of an end cap mounted to each distal end, each said end cap having an electrical connector electrically connected to the light strip. A life extending gas is hermetically sealed within the diffusion tube.

BRIEF DESCRIPTION OF DRAWINGS

The foregoing and other aspects and advantages of the present invention will be apparent from the following detailed description, as illustrated in the accompanying drawings, in which:

FIG. 3b is a bottom view of the LED light strip in FIG. 3a;

FIG. 5b is an expanded view of the circled region 5b shown in FIG. 5a;

DETAILED DESCRIPTION

Figure 1A:
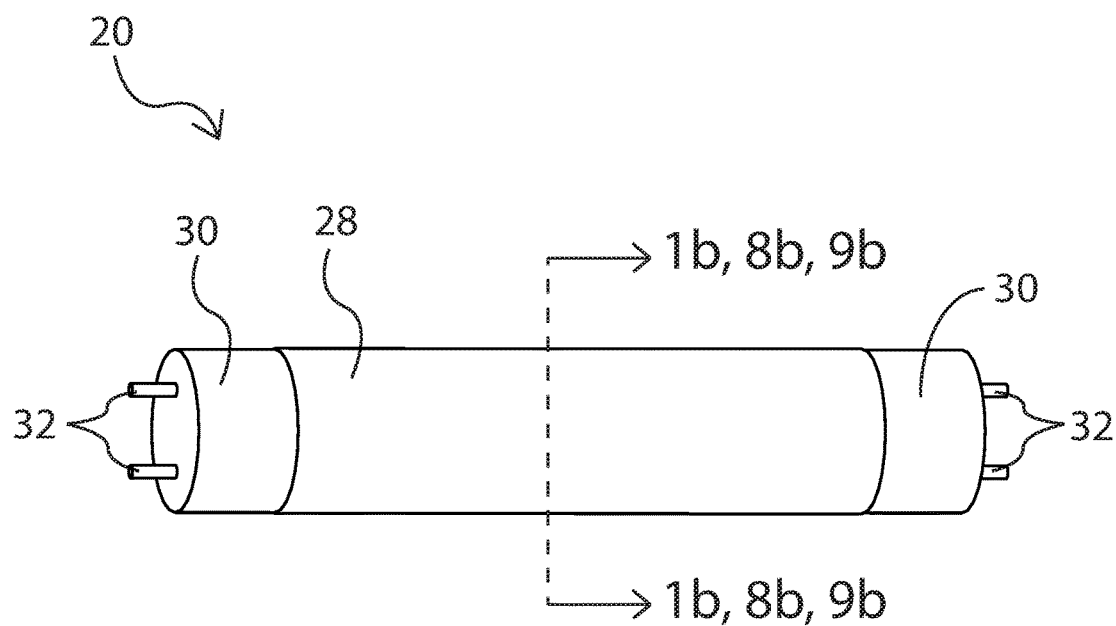
FIG. 1a is an isometric view of an illumination device.
Figure 1B:
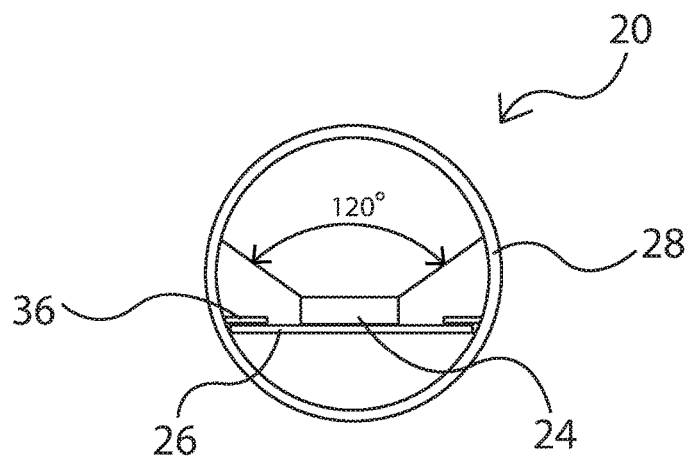
FIG. 1b is a side sectional view along line 1b-1b when light strip of FIGS. 3a and 3b is used.
Figure 2:
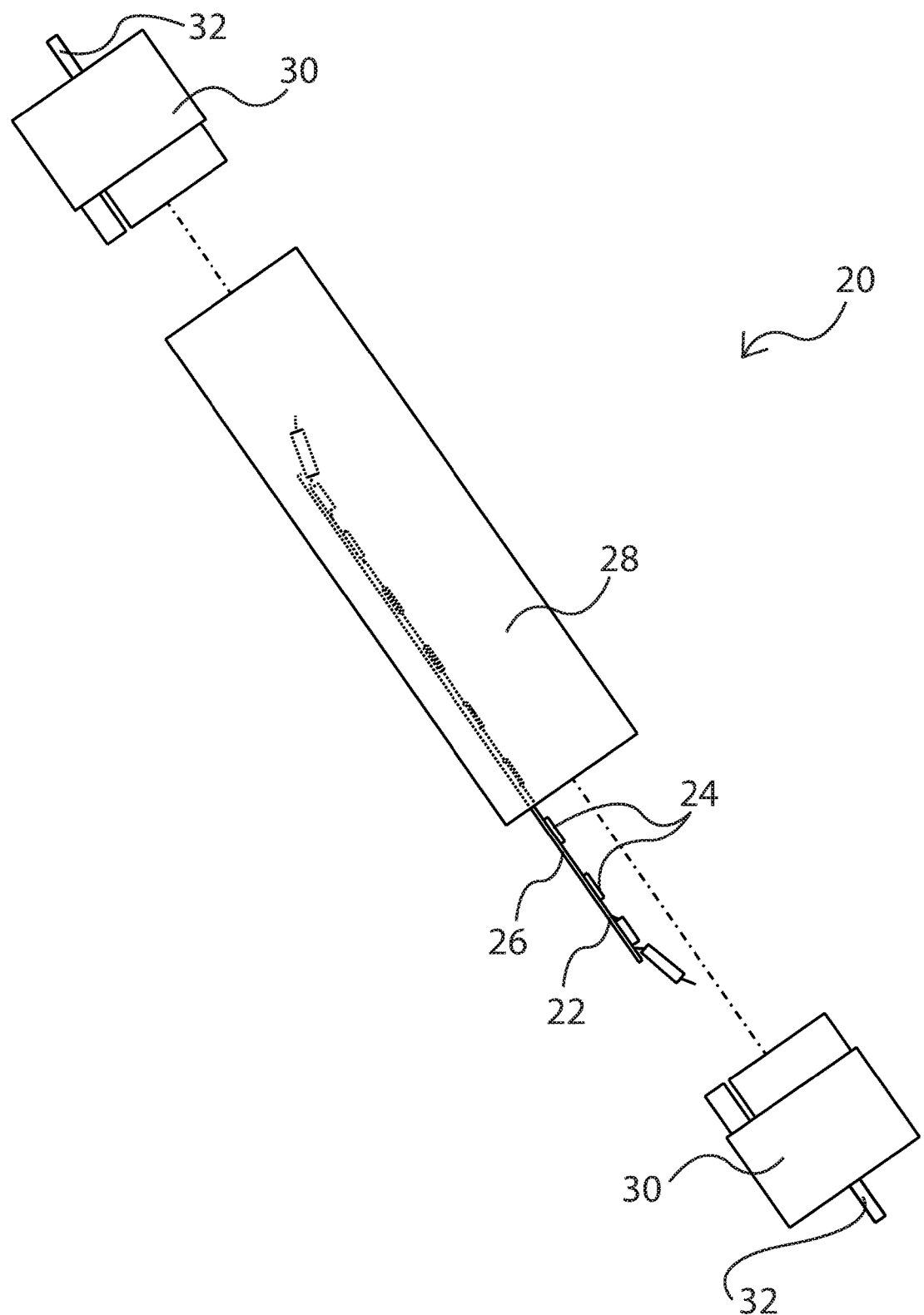
FIG. 2 is an exploded view showing various components and how they fit together for the illumination device shown in FIG. 1.

FIGS. 1-12d show various aspects of illumination device 20. One embodiment of illumination device 20, FIGS. 1a-2, comprises a light strip 22. Light strip 22 is preferably an LED light strip with LED's (Light Emitting Diodes) 24 spaced along the length of the strip. LED's 24 may be mounted to a printed circuit board (PCB) 26. Alternatively, the LED light strip may be an LED light string with LED die directly, resistively adhered or soldered to each other in a long strip. A diffusion tube 28 having a tube length and distal ends surrounds light strip 22. An end cap 30 is mounted to each distal end. Each end cap 30 has an electrical connector 32. Each electrical connector 32 is electrically connected to light strip 22. Each end cap 30 may be sonically welded, spin welded, adhered, etc. to diffusion tube 28 forming a hermetic seal 33 with the diffusion tube. A hermetic seal is a seal where no air, other gases and/or liquids can go in or out between diffusion tube 28 and end cap 30.

Figure 3A:
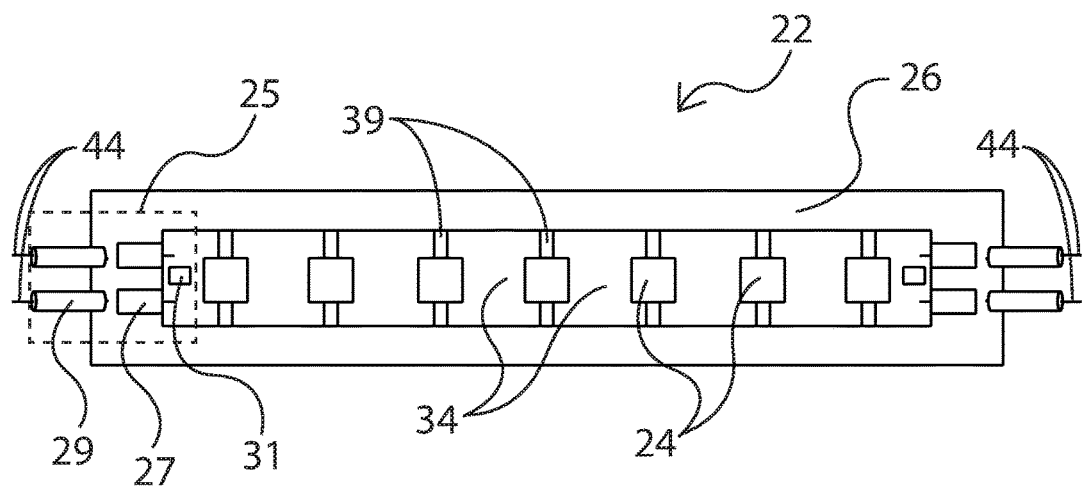
FIG. 3a is a top view of LED light strip shown in FIG. 2.
Figure 3B:
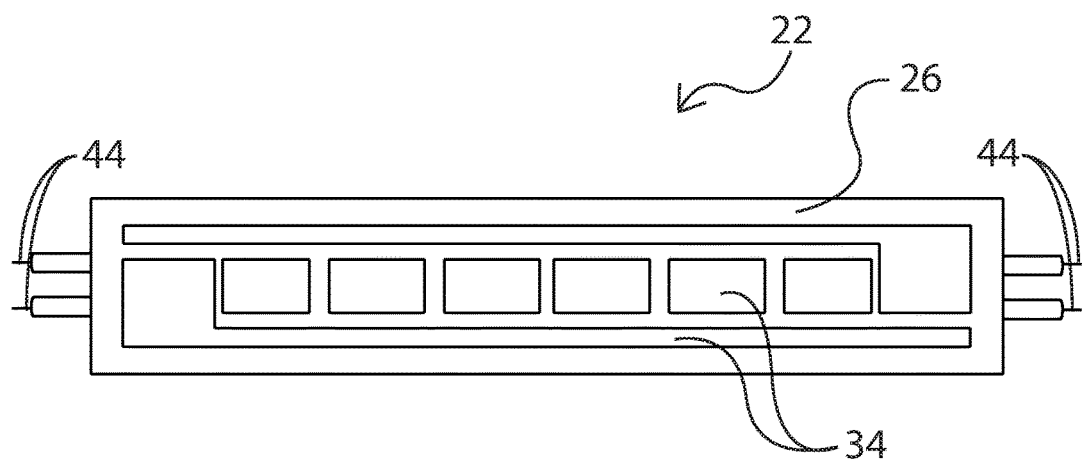

In one embodiment, light strip 22 is constructed of a printed circuit board 26 with one or more light emitting elements, FIG. 3. Light emitting elements are LED's spaced along the PCB. PCB 26 may be a thin board made of insulating material 39 such as fiberglass composite epoxy, or other insulating laminate material. Conductive pathways 34 are etched or "printed" onto the board. Conductive pathways 34 are generally conductive materials such as copper, other metals, metal composite structures, conductive polymers or conductive oxides that provide for good electrical conductivity between electrical components. Some of the electrical components that may be interfaced with the light strip 22 are driver circuitry 25, diodes 27, fuses, resistors 29, inductors, capacitors 31, fuses and bridge rectifiers 35. These components are not all explicitly shown in FIG. 3, but it is understood that any of these components as shown and described elsewhere in the disclosure could be interfaced with light strip 22.

Figure 4A:
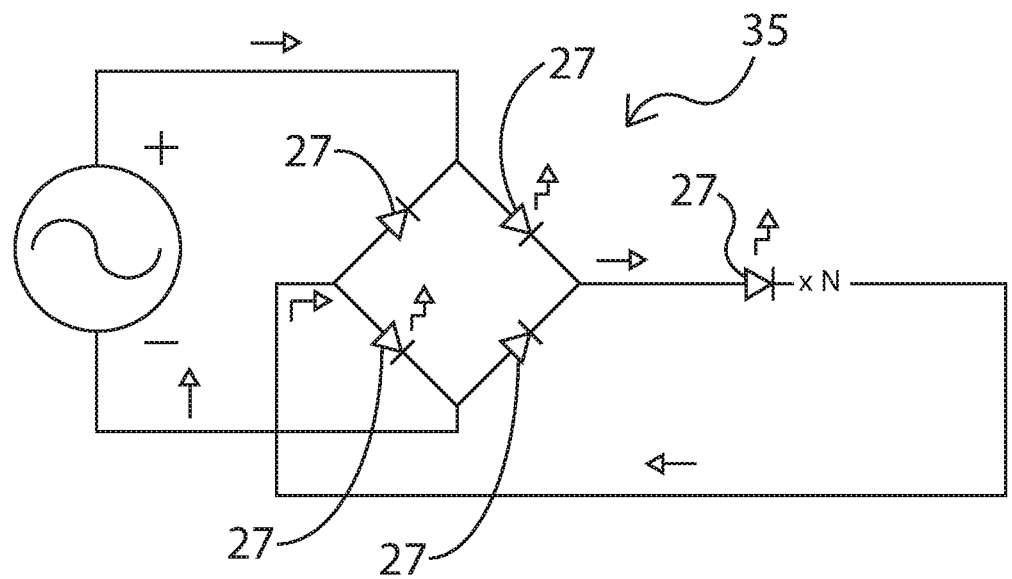
FIG. 4a is a circuit diagram of a bridge rectifier in a first electrical state that may be used with illumination device of FIG. 1.
Figure 4B:
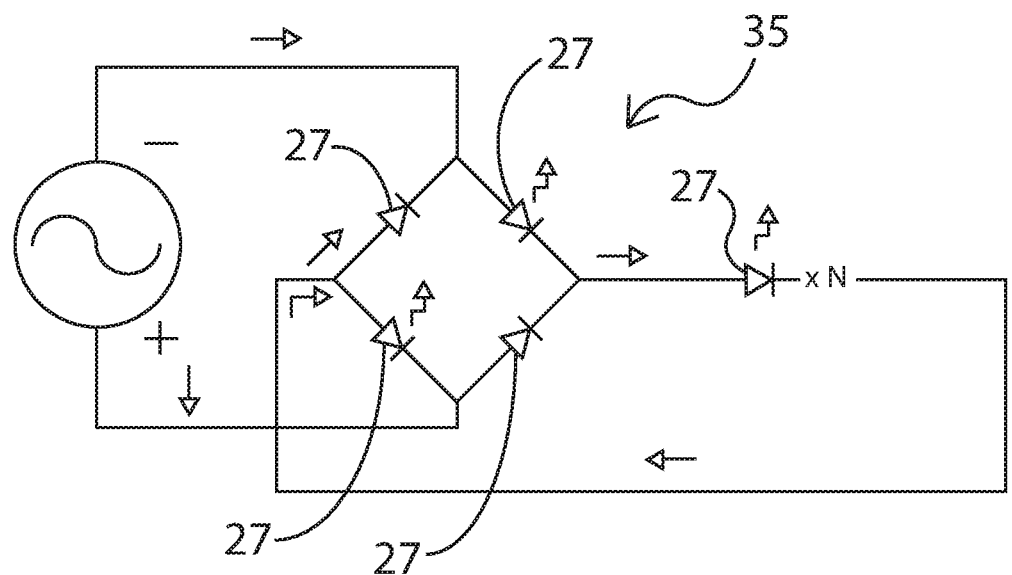
FIG. 4b is a circuit diagram of a bridge rectifier in a second electrical state that may be used with illumination device of FIG. 1.
Figure 5A:
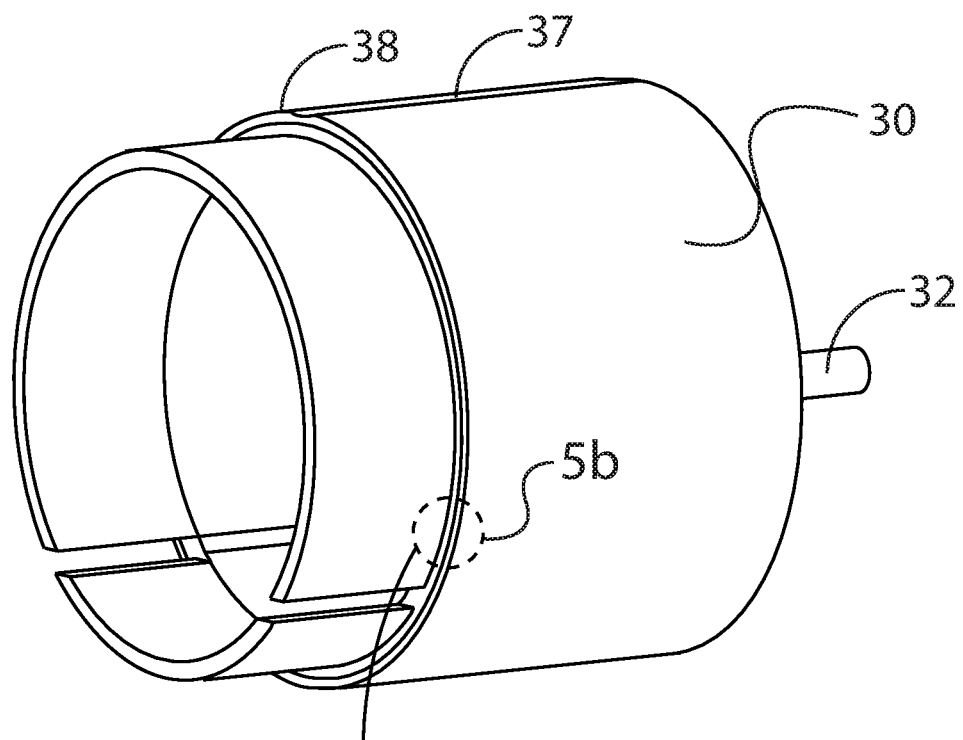
FIG. 5a is an isometric view of the end cap shown in FIG. 2.
Figure 5B:
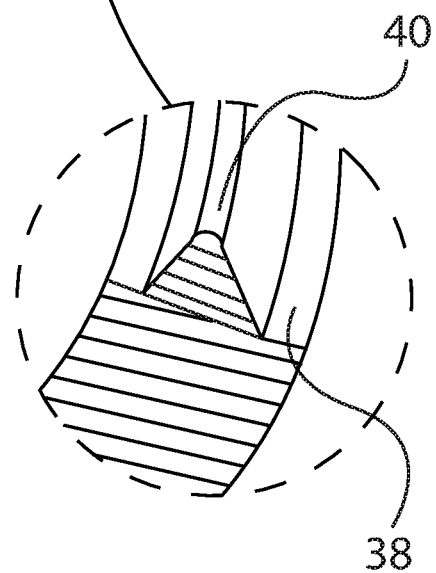

The AC voltage from a typical fluorescent ballast needs to be rectified before the LEDs in the replacement tube can use the voltage. Bridge rectifier 35 may do this with four individual diodes 27 or a package of diodes. The individual diodes 27 are shown in FIGS. 4a and 4b. In one embodiment LEDs are used as the individual diodes that make up the full bridge, or ½, or ¼ bridge. A ¼ bridge is 1-diode. A ½ bridge is 2-diodes. A full bridge is 4-diodes. Therefore, the bridge LEDs could be placed in convenient but separate locations and help generate light instead of just making heat. This design thereby generates an illumination device 20 with further energy savings over current state of the art LED light tubes.

Diffusion tube 28 is a light diffusion tube having an inner tube radius and an outer tube radius. Diffusion tube 28 accepts light impinging the inside of the tube, allows the light to travel within the light tube and then disperses it to exit at various points along the tubes length. In this manner, discrete light, from individual LED's spaced along the length of the light strip 22, is emitted from the diffusion tube to have a more continuous and uniform appearance like a fluorescent light tube. Diffusion tube 28 may be constructed from materials such as polycarbonate, glass, etc. Diffusion tube 28 may have a ridge 36 along the length of the inner diameter to secure light strip 22 to one side of diffusion tube 28 so light from the light emitting elements impinges more than 180-degrees of the inner surface of the tube to improve light uniformity radially within the tube. Standard 50-percent light emission lines are shown at 120-degrees, FIG. 1b.

One end cap 30 mates with each distal end of diffusion tube 28. Each end cap 30 includes an electrical connector 32 for making electrical connection between electrical components of light strip 22 and the power socket of the fixture in which the light tube will operate. End cap 30 includes a ledge 38 that mates with each distal end of diffusion tube 28. Prior to sonically welding each end cap 30 to diffusion tube 28, each ledge may have a welding ridge 40 to facilitate welding, FIGS. 5a and 5b. After sonic welding, a hermetic seal 33 is created between welding ridge 40 and the end of diffusion tube 28. Sonic welding creates a bonded region of material that is impervious to gases and liquids. End cap 30 may include an indicator 37 such as a groove to show the light output direction; i.e., the side of illumination device 20 that should be facing away from the fixture.

Figure 6A:
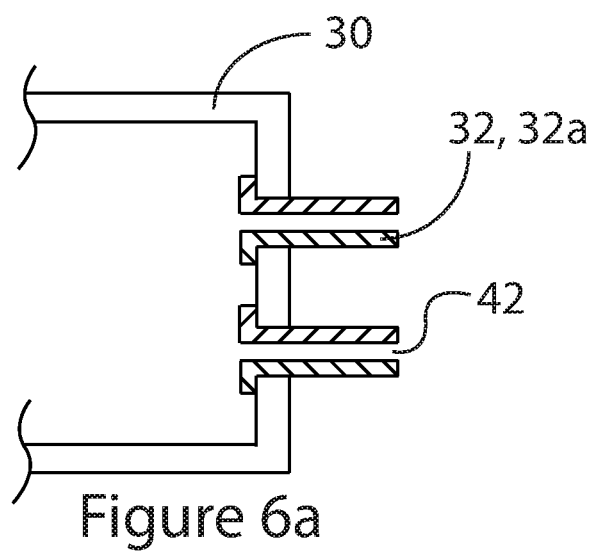
FIG. 6a is a sectional view of a first type of electrical connector that may be used in conjunction with the illumination device of FIG. 1.
Figure 6B:
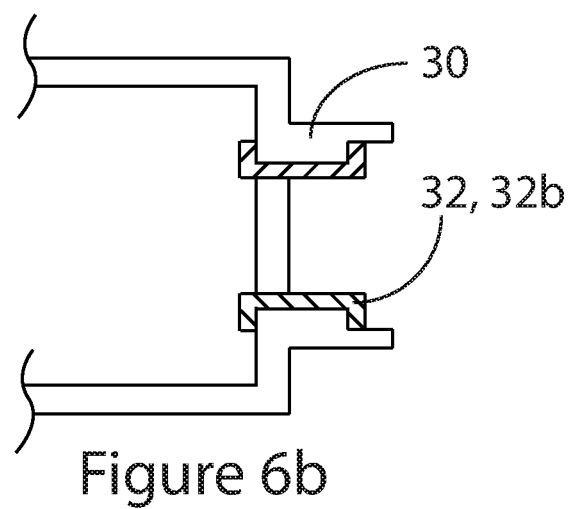
FIG. 6b is a sectional view of a second type of electrical connector that may be used in conjunction with the illumination device of FIG. 1.
Figure 6C:
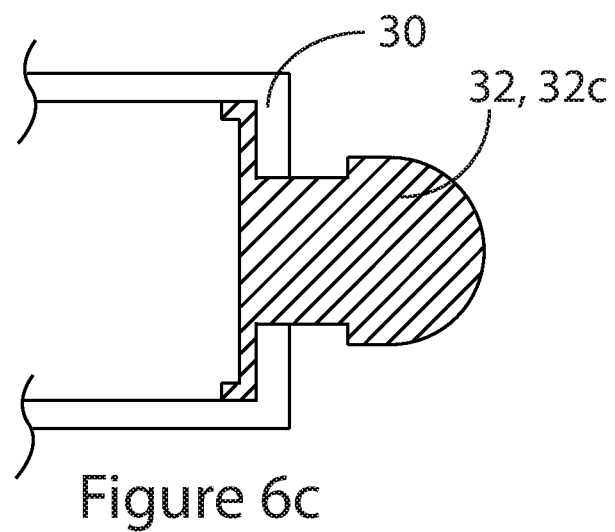
FIG. 6c is a sectional view of a third type of electrical connector that may be used in conjunction with the illumination device of FIG. 1.
Figure 7A:
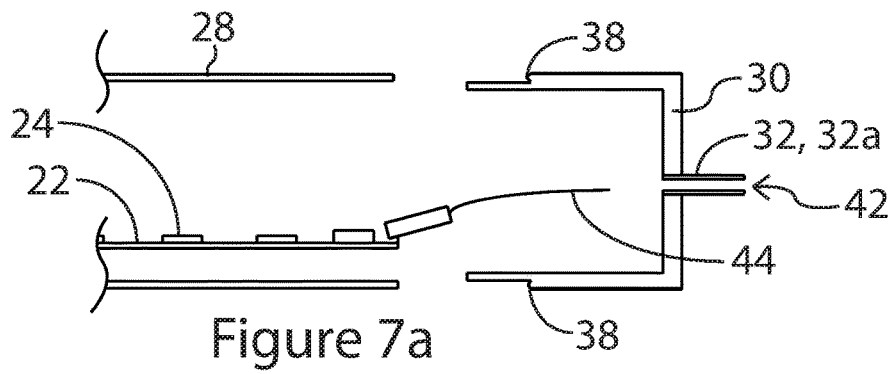
FIG. 7a is a sectional view showing a first step in the method of hermetically sealing the illumination device in FIG. 1.
Figure 7B:
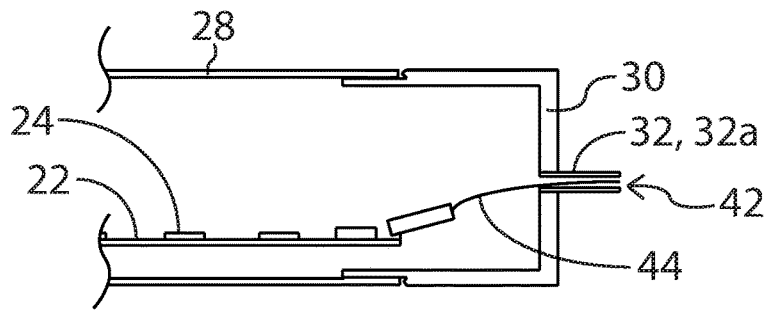
FIG. 7b is a sectional view showing a second step in the method of hermetically sealing the illumination device in FIG. 1.
Figure 7C:
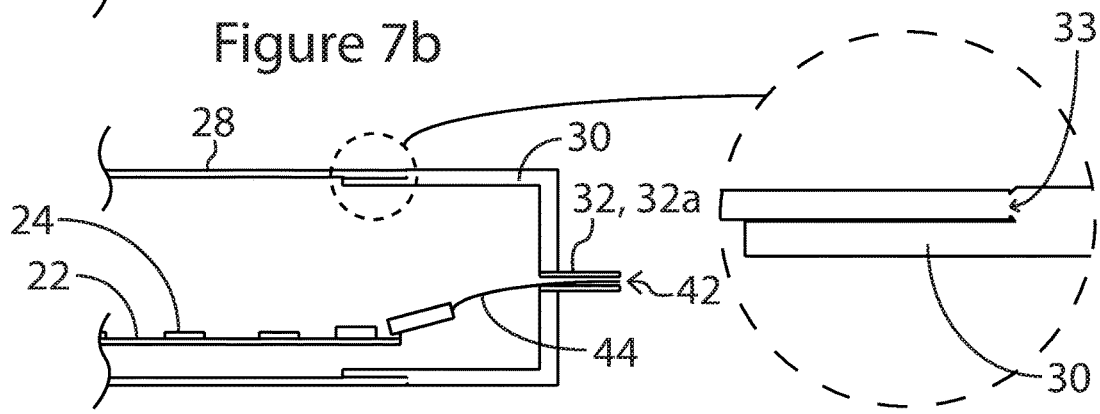
FIG. 7c is a sectional view showing a third step in the method of hermetically sealing the illumination device in FIG. 1.
Figure 7D:
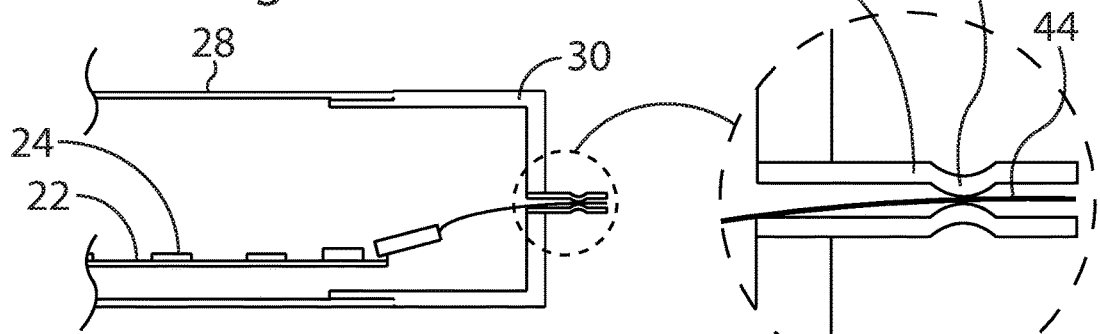
FIG. 7d is a sectional view showing a fourth step in the method of hermetically sealing the illumination device in FIG. 1.
Figure 8A:
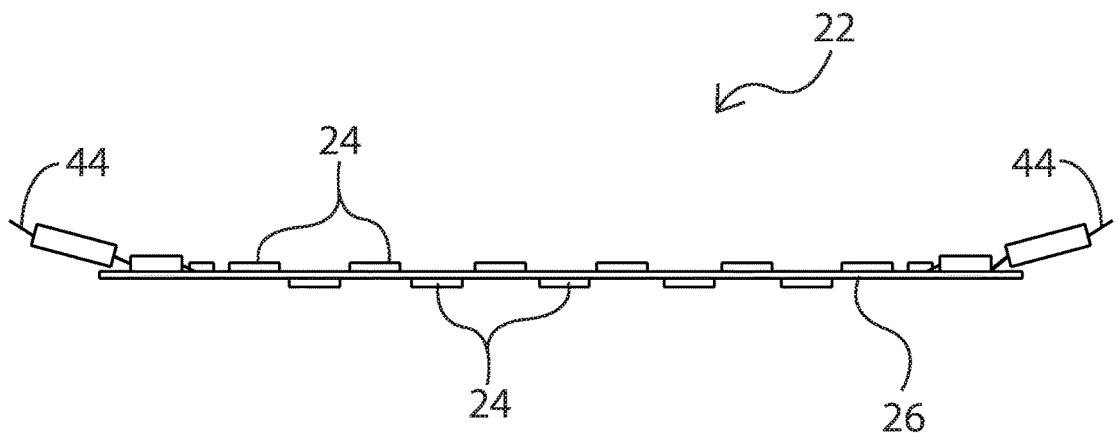
FIG. 8a is a side view of one embodiment of an LED light strip structure that can be used in conjunction with the illumination device of FIG. 1.
Figure 8B:
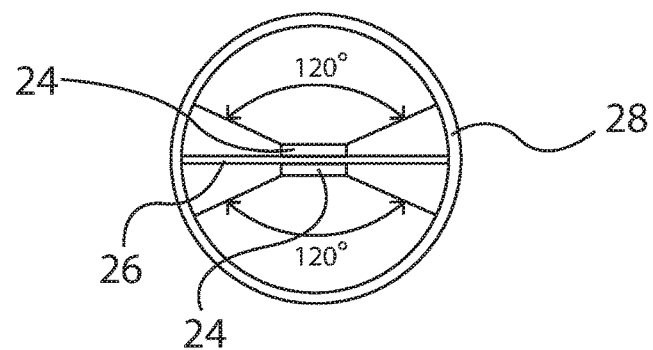
FIG. 8b is a side sectional view along line 8b-8b of FIG. 1 when light strip of FIG. 8a is used.

In one embodiment, electrical connectors 32 for each end cap are two pins 32a (bi-pin) with through holes 42 interior the pins, FIG. 6a. Electrical leads 44 from light strip 22 are passed through each pin 32a and the pins crimped or soldered to make a secure and hermetic seal. Depending on the application, other types of electrical connectors 32 may also be used such as in FIG. 6b showing a double post 32b, FIG. 6c showing a single pin 32c, or even a recessed contact or some other type of electrical connector.

It has been found that when bi-pin electrical connectors 32a are used, that if the electrical leads 44 are connected to the bi-pins prior to sonic welding, the sonic welding process can degrade the integrity of the electrical connection. Therefore, it is critical to have a non-rigid connection between electrical connectors 32 and light strip 22 prior to welding. An exemplary process to achieve hermetic sealing illumination device 20 and still have highly reliable electrical connections is as shown in FIGS. 7a-d. The process involves providing light strip 22 with electrical leads 44 extending from a connection end, diffusion tube 28 with distal ends, and an end cap 30 having bi-pins 32a with through holes 42. The process then involves inserting light strip 22 into diffusion tube 28 so that electrical leads 44 extend from the diffusion tube, FIG. 7a. The process further involves positioning end cap 30 to interface with diffusion tube 28 so that electrical leads 44 extend freely through pin through holes 42, FIG. 7b. End cap 30 is then sonically welded to diffusion tube 28 to create a hermetic seal 33, FIG. 7c. Finally, electrical connections are made between pins 32a and electrical leads 44, FIG. 7d. Connection between pin 32a and electrical leads 44 is also a hermetic seal 33.

Improvements in light uniformity are another benefit of the present illumination device 20. In one embodiment, FIG. 8a, light strip 22 includes LEDs on both the front side and back side of the light strip. Standard 50-percent light emission lines are shown at 120-degrees, FIG. 8b.

Figure 9A:
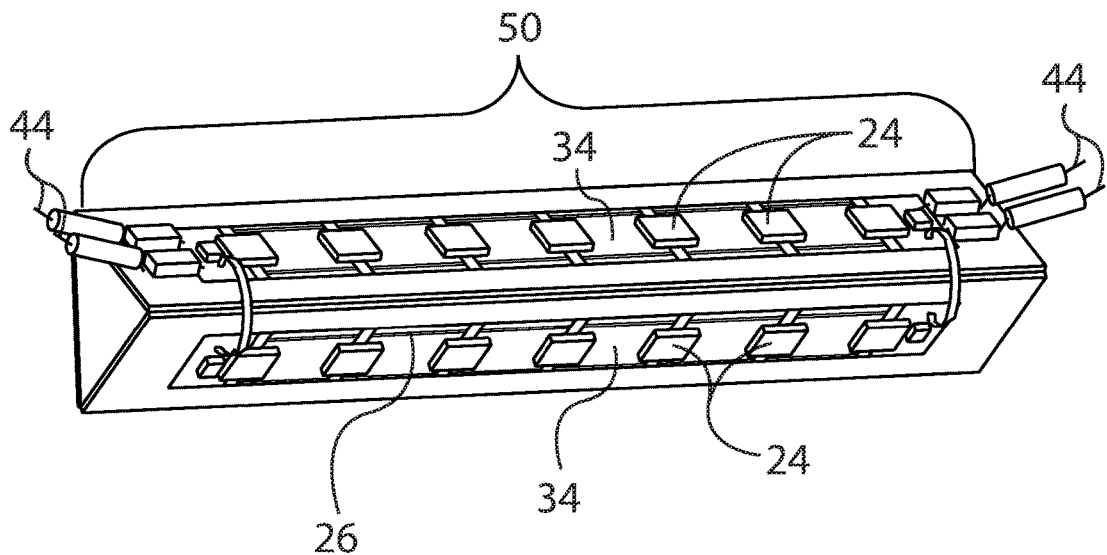
FIG. 9a is a perspective view of one embodiment of an LED light strip structure that can be used in conjunction with the illumination device of FIG. 1.
Figure 9B:
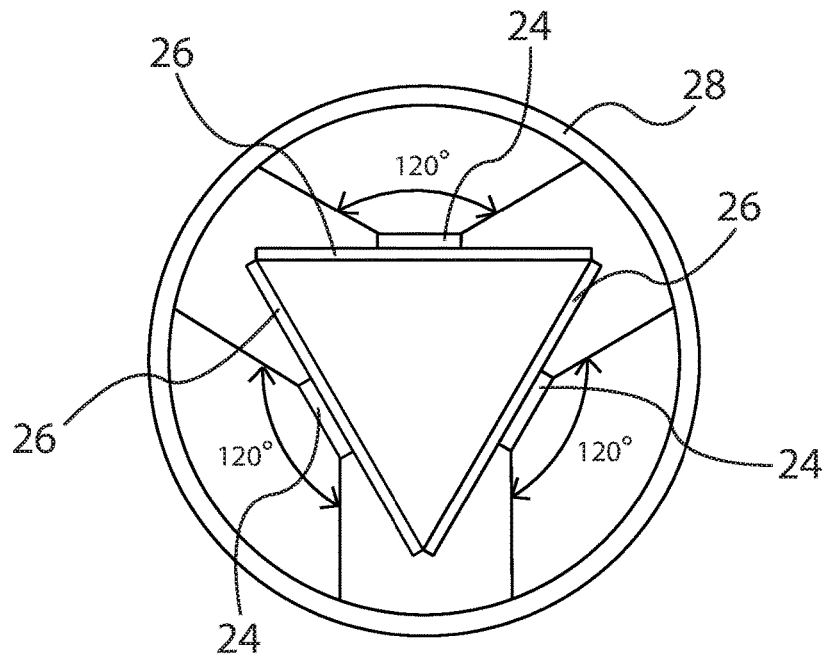
FIG. 9b is a side sectional view along line 9b-9b of FIG. 1 when light strip of FIG. 9a is used.

Improvements in light uniformity are also shown in FIG. 9a where light strip 22 includes a plurality of light strips. Three LED light strips are mounted adjacent each other to form a three-sided LED polygon 50. Standard 50-percent light emission lines are shown at 120-degrees, FIG. 9b. Diffusion tube 28 further diffuses the light to give 360-degree uniform light emission along the tube length. In other embodiments more than three LED light strips can be mounted adjacent to each other forming more than three sides to the polygon.

Figure 10:
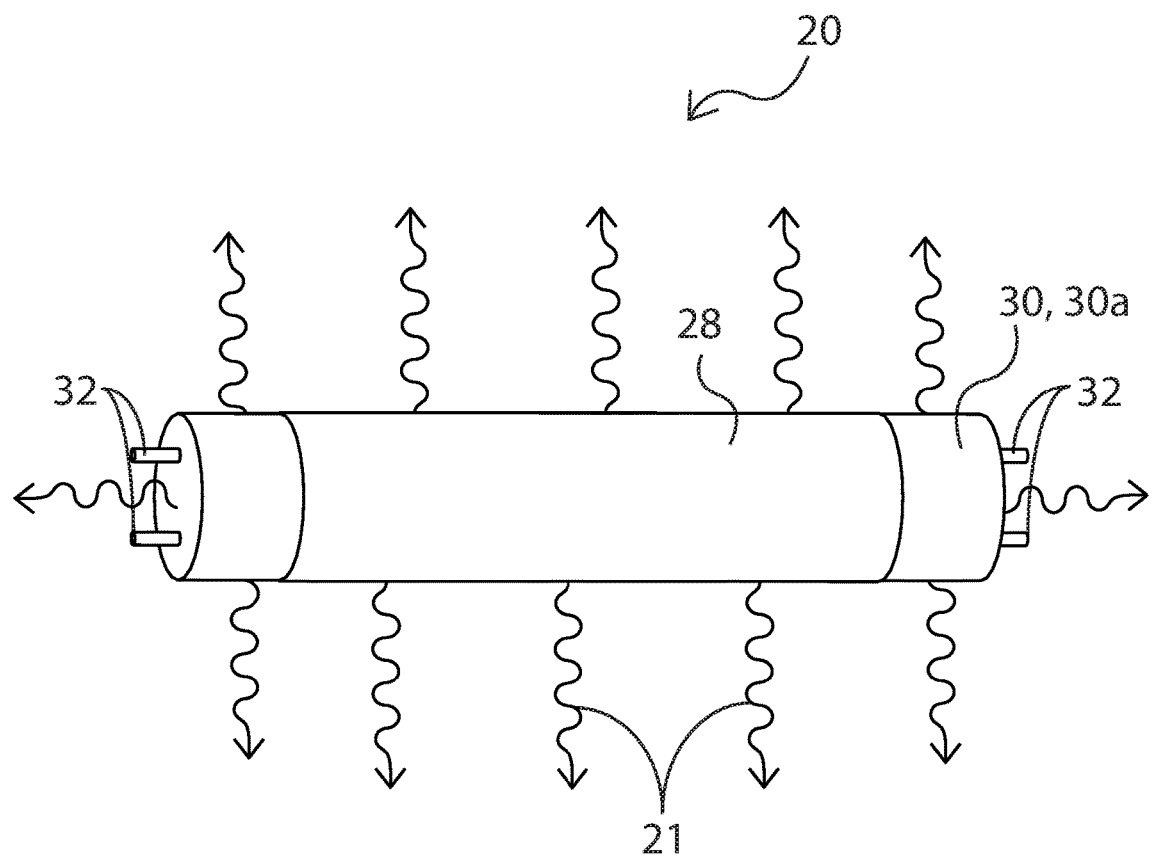
FIG. 10 is an isometric view of the illumination device of FIG. 1 now with light diffusing end caps.

Further improvements in light uniformity may be obtained by including light diffusing end caps 30a, FIG. 10. Light diffusing end caps 30a now provide for light 21 extending out the ends of illumination device 20.

Conventional fluorescent light tubes often utilize filament heaters at each end of the tube that, when heated, aid in the emission of electrons necessary to create the plasma in the tube and thereby produce light. Ballasts, such as the "rapid start" type or the "programmed start", provide specific low voltage current to provide this heating. Since LED tube replacements do not require this current, they often do not provide a connection that resembles the filament electrically. Some ballasts interpret this lack of filament power usage as an indication of fault in the tube and therefore may go into a fail-safe mode or exhibit some other unwanted behavior. One solution is to provide as part of the illumination device 20 a load, such as resistors, or temperature coefficient resistors, to simulate the filament and thereby fool the ballast into thinking the tube is a conventional gas fluorescent tube. The problem with this approach is that the power sent to the "filaments" (or their substitute) is lost as heat and reduces the efficiency of the lamp as a light source. The wasted power can be 10% or more of the total power input. By carefully arranging a filament simulator circuit so that LEDs are employed as the substitute filament load (a.k.a. filament simulator 60), the power intended for heating the filaments can be redirected to contributing to light output, improving the efficiency of illumination device 20. By further arranging the circuit, LEDs can be used to provide light from both the filament power and the "arc" power. Using this technique, the number of LEDs, which can be a major cost of the device, can be reduced. Other variations of the circuit allow a test LED lamp to indicate whether there is filament power being provided and help to identify the type of ballast in the fixture without opening the fixture.

Figure 11A:
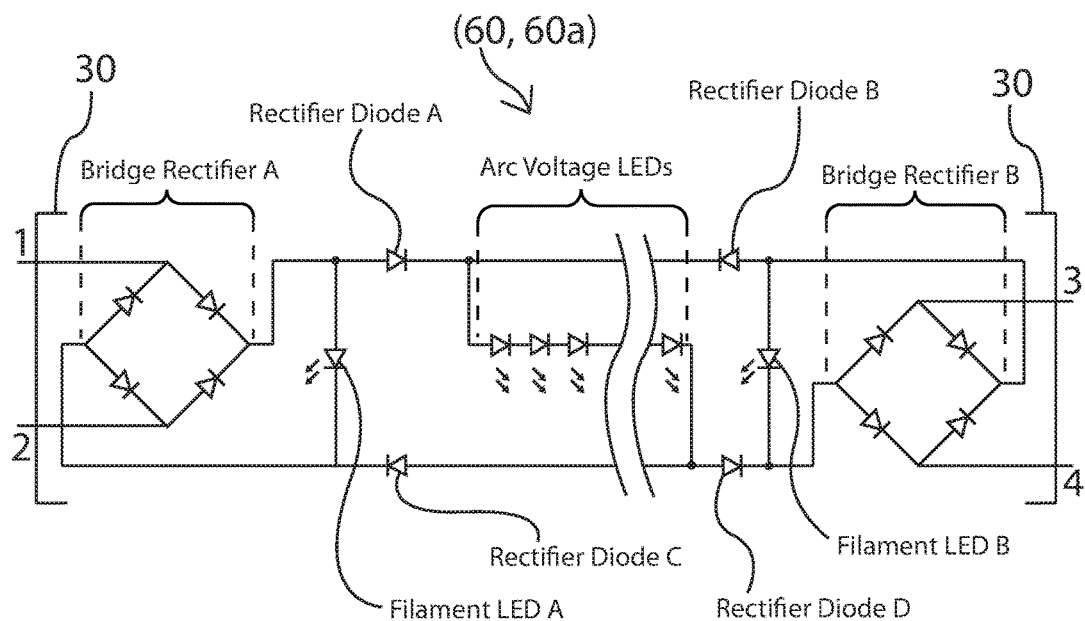
FIG. 11a is a schematic diagram of one embodiment of a filament simulator that can be used in conjunction with the illumination device of FIG. 1.
Figure 11B:
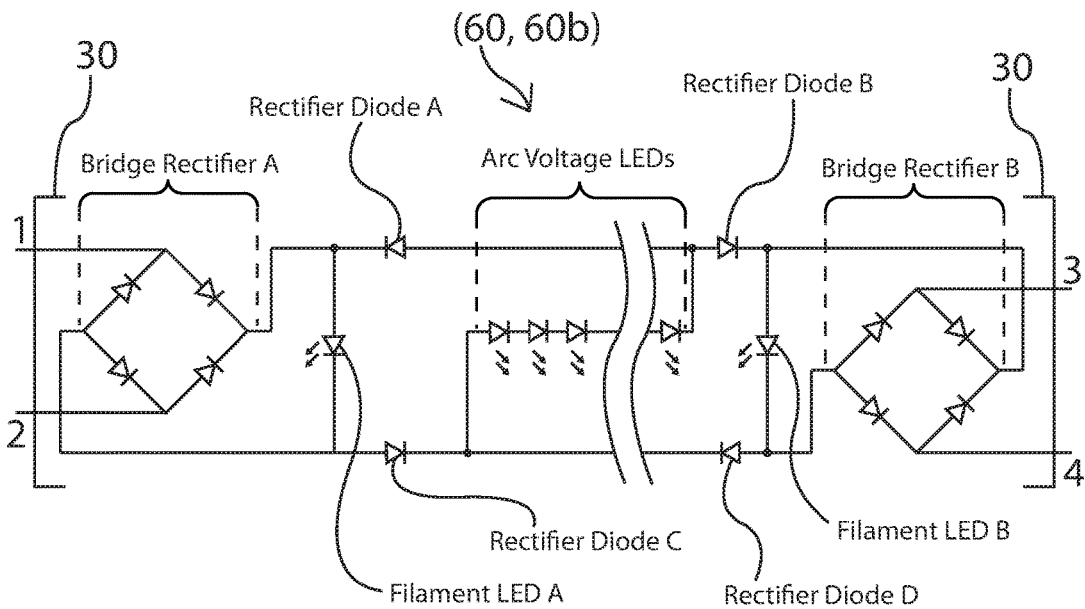
FIG. 11b is a schematic diagram of another embodiment of a filament simulator that can be used in conjunction with the illumination device of FIG. 1.

In one embodiment of illumination device 20, filament simulators 60 may be provided as shown in FIGS. 11a and 11b. In one variant, filament simulator (60, 60a) includes a filament simulator circuit as shown in FIG. 11a where power enters the tube on the four pins (1, 2, 3, 4), two on each end. Typically, in the fluorescent tube these pins were arranged to provide filament power to the heaters on each end of the fluorescent tube and a high voltage across the entire length of the tube. Power entering on pin 1 as filament power is rectified by Bridge Rectifier A and applied across Filament LED A and then, through Bridge Rectifier A is returned to pin 2. Arc (high voltage) power applied to pin 1 is half wave rectified by Bridge Rectifier A and passed through Rectifier Diode A. The power then travels through the Arc voltage LEDs string, providing the majority of the light, and is passed through Rectifier Diode D to then be half rectified by Bridge Rectifier B and returned on pin 3 or 4. Filament LED B only sees filament power full wave rectified by Bridge Rectifier B from pins 3 and 4. If the positive power enters on pin 2, again the power to Filament LED A can only come from the Bridge Rectifier A and pins 1 and 2. Again, Rectifier Diode A, the Arc voltage LEDs and Rectifier Diode D are used to pass the arc (high voltage) power. If the positive power is applied on pins 3 or 4, the Bridge Rectifiers work as above to provide filament and arc power, but arc (high voltage) power travels through Rectifier Diode B, the Arc voltage LEDs, and then Rectifier Diode C.

In another variant, filament simulator (60, 60b) includes a filament simulator circuit as shown in FIG. 11b where the Rectifier Diodes and Arc voltage LEDs have been reversed. The effect of this is to route both the filament power as well as the arc power through the Filament LEDs. In the case where pin 1 or 2 is positive, the filament and arc power are rectified by the Bridge Rectifier A and passed through the Filament LED A before passing through Rectifier Diode C, then the Arc voltage LEDs, then the Rectifier Diode B, then Filament LED B and finally through Bridge Rectifier B and returned on pin 3 or 4. In the case where pin 3 or 4 is positive, power travels through Bridge Rectifier B, then Filament LED B, then Rectifier Diode D, then the Arc voltage LEDs, then Rectifier Diode A, then Filament LED A, then Bridge Rectifier A, and finally is returned by pin 1 or 2. This has the effect of causing the Filament LEDs to utilize the power from both filament and arc power supplies in the ballast.

Figure 12A:
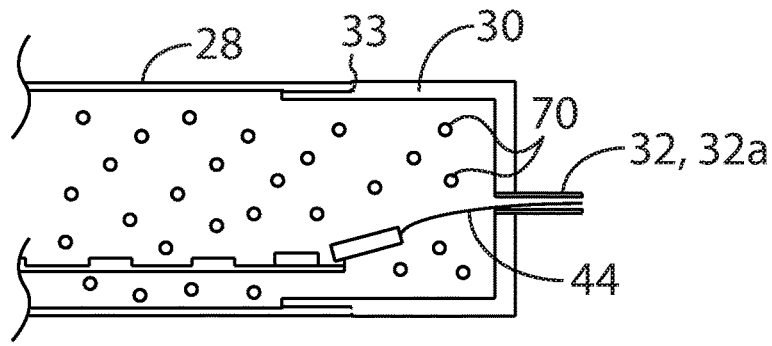
FIG. 12a is a sectional view showing a first step in introducing a life extending gas into the illumination device of FIG. 1.
Figure 12B:
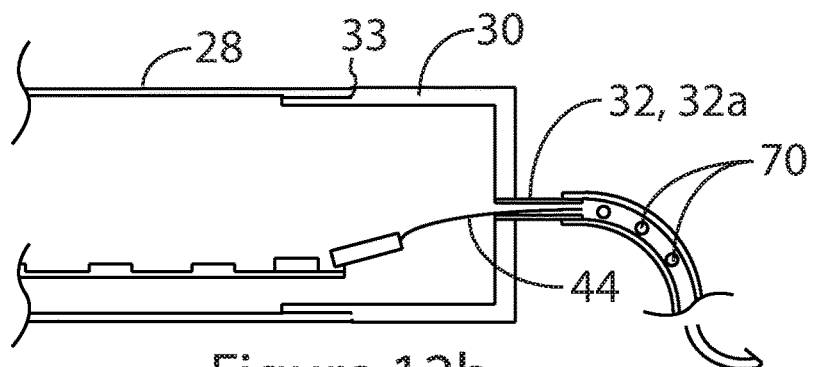
FIG. 12b is a sectional view showing a second step in introducing a life extending gas into the illumination device of FIG. 1.
Figure 12C:
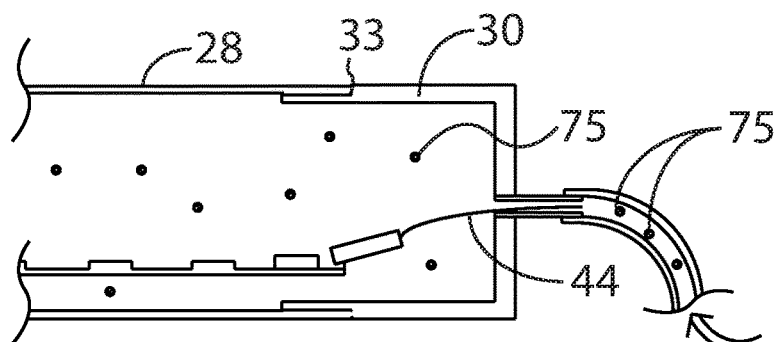
FIG. 12c is a sectional view showing a third step in introducing a life extending gas into the illumination device of FIG. 1.
Figure 12D:
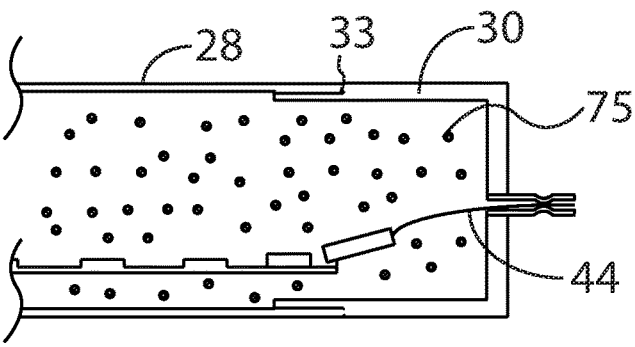
FIG. 12d is a sectional view showing a fourth step in introducing a life-extending gas into the illumination device of FIG. 1.

An illumination device 20 using LED's can typically have a life of twenty years. In harsh environments, this lifetime may be degraded due to humidity or corrosive elements attacking the electronics. This degradation is now mitigated with hermetic sealing and long lifetimes retained. But now with the presence of the hermetic seal, the gas environment within the hermetically sealed tube can be changed. A vacuum, low moisture gas, inert gas or special thermally conductive gas can be introduced. For example, helium has seven times the conductivity of air and as such can help remove heat away from the LEDs. Removal of heat and keeping the LED's cooler during operation can also extend the life of the LED. As a result, the life time of illumination device 20 may be pushed beyond the typical twenty years. The use of life-extending gas in illumination device 20 and one embodiment of a process of introducing such a gas are illustrated in FIGS. 12a-12b. End caps 30 are first sonically welded to diffusion tube 28, FIG. 12a. Illumination device 20 then has the air 70 pumped out, FIG. 12b. A life-extending gas 75 is then re-introduced into illumination device 20, FIG. 12c. Finally, a hermetic seal is provided at electrical connector 32 to keep the life-extending gas hermetically sealed within the illumination device 20, FIG. 12d. Other gas introduction and sealing processes may also be used to introduce the life-extending gas.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:
1. An illumination device, comprising:
   a) an LED light strip having one or more arc voltage LEDs;
   b) a diffusion tube having a tube length and distal ends, said diffusion tube surrounding said LED light strip;
   an end cap mounted to each distal end, each said end cap having an electrical connector, said electrical connector electrically connected to said LED light strip,
   c) each said end cap is bonded to said diffusion tube forming a seal with said diffusion tube; and
   d) a filament simulator having a first filament LED and a second filament LED; said filament simulator includes a filament simulating circuit including a first bridge rectifier that rectifies ballast power and applies the rectified power to said first filament LED, a second bridge rectifier that rectifies ballast power and applies the rectified power to said second filament LED, and fourth rectifying diodes between said first and second bridge rectifiers; said first and second bridge rectifiers direct power to create light from the ballast power; and said rectifying diodes direct arc power through said one or more arc voltage LEDs to create light from the arc power.

2. The illumination device as recited in claim 1, further comprising driver circuitry interfaced with said LED light strip.
3. The illumination device as recited in claim 1 further comprising a hermetic seal, wherein said hermetic seal is a sonically welded hermetic seal.
4. The illumination device as recited in claim 1, wherein said first and second bridge rectifiers includes diodes, wherein one or more of said diodes are an LED.
5. The illumination device as recited in claim 1, wherein said end cap includes a ledge having a welding ridge that is sonically welded to said diffusion tube.
6. The illumination device as recited in claim 1, wherein said electrical connector is two pins.
7. The illumination device as recited in claim 6, wherein said pins have a hermetic seal.
8. The illumination device as recited in claim 1, wherein said LED light strip includes a circuit board having a board length, front side and back side; wherein said LEDs are spaced along said board length on said front side.
9. The illumination device as recited in claim 1, wherein LEDs are spaced along said board length on said back side.
10. The illumination device as recited in claim 1, further comprising three LED light strips mounted adjacent to each other to form a three-sided LED polygon giving 360-degree uniform light emission through said diffusion tube along said tube length.
11. The illumination device as recited in claim 1, wherein said end caps are light diffusing end caps.
12. The illumination device as recited in claim 1, further comprising a life-extending gas hermetically sealed within said light tube.
13. The illumination device as recited in claim 12, wherein said life-extending gas is a low moisture gas.
14. The illumination device as recited in claim 12, wherein said life-extending gas is a non-reactive gas.
15. The illumination device as recited in claim 12, wherein said life-extending gas is a high thermal conductivity gas.
16. The illumination device as recited in claim 1, wherein said end cap includes a ledge that mates with each distal end of diffusion tube.
17. An illumination device for interfacing with a four pin alternating current fluorescent light fixture that provides a ballast and an arc voltage, comprising:
   a) an LED light strip including a first filament LED, a second filament LED, and one or more arc voltage LEDs;
   b) a filament simulator circuit interfaced with said LED light strip, said filament simulator circuit including a first bridge rectifier that rectifies power from the first and second pins and applies that power to said first filament LED, a second bridge rectifier that rectifies power from the third and fourth pins and applies that power to said second filament LED;
   c) a diffusion tube having a tube length and distal ends, said diffusion tube surrounding said LED light strip;
   d) an end cap integrated with each distal end, each said end cap having two electrical connectors electrically connected to said LED light strip; and
   e) wherein said filament simulator circuit.
18. The illumination device as recited in claim 17, wherein said filament simulator includes a bridge rectifier using one or more LEDs as the rectification diodes.
19. The illumination device as recited in claim 17, wherein said filament simulator circuit further includes four rectifying diodes integrated between said first and second bridge rectifiers, wherein the rectifying diodes direct arc power to one or more arc LEDs utilizing arc power to generate light.

20. The illumination device as recited in claim 19, wherein the first rectifying diode is connected in series between the positive end of first filament LED and the arc LEDs, wherein the second rectifying diode is connected in series between the negative end of first filament LED and the arc LEDs, wherein the third rectifying diode is connected in series between the positive end of second filament LED and the arc LEDs, wherein the fourth rectifying diode is connected in series between the negative end of second filament LED and the arc LEDs.

21. The illumination device as recited in claim 20, wherein the first and second rectifying diodes rectify in the same direction as the first filament LED and the third and fourth rectifying diodes rectify in the same direction as second filament LED.

22. The illumination device as recited in claim 20, wherein the first rectifying diode rectifies opposite the second rectifying diode and the third rectifying diode rectifies opposite the fourth rectifying diode.

\* \* \* \* \*

UNITED STATES PATENT AND TRADEMARK OFFICE
CERTIFICATE OF CORRECTION

PATENT NO. : 10,088,142 B1
APPLICATION NO. : 15/206472
DATED : October 2, 2018
INVENTOR(S) : McGrath et al.

Page 1 of 2

It is certified that error appears in the above-identified patent and that said Letters Patent is hereby corrected as shown below:

Column 7, Lines 45-67, Claim 1 should read as follows:
1. An illumination device, comprising:
    a) an LED light strip having one or more arc voltage LEDs;
    b) a diffusion tube having a tube length and distal ends, said diffusion tube surrounding said LED light strip;
    c) an end cap mounted to each distal end, each said end cap having an electrical connector, said electrical connector electrically connected to said LED light strip, each said end cap is bonded to said diffusion tube forming a seal with said diffusion tube; and
    d) a filament simulator having a first filament LED and a second filament LED;
    said filament simulator includes a filament simulating circuit including a first bridge rectifier that rectifies ballast power and applies the rectified power to said first filament LED, a second bridge rectifier that rectifies ballast power and applies the rectified power to said second filament LED, and four rectifying diodes between said first and second bridge rectifiers;
    said first and second bridge rectifiers direct power to create light from the ballast power, and said rectifying diodes direct arc power through said one or more arc voltage LEDs to create light from the arc power.

Column 8, Lines 4-6, Claim 3 should read as follows:
3. The illumination device as recited in claim 1, further comprising a hermetic seal, wherein said hermetic seal is a sonically welded hermetic seal.

Column 8, Lines 43-61, Claim 17 should read as follows:
17. An illumination device for interfacing with a four pin alternating current fluorescent light fixture that provides a ballast and an arc voltage, comprising:
    a) an LED light strip including a first filament LED, a second filament LED, and one or more arc voltage LEDs;
    b) a filament simulator circuit interfaced with said LED light strip, said filament simulator circuit including a first bridge rectifier that rectifies power from the first and second pins and applies that power to said first filament LED, a second bridge rectifier that rectifies power from the third and fourth pins and applies that power to said second filament LED;

Signed and Sealed this
Twenty-eighth Day of May, 2019

Andrei Iancu
*Director of the United States Patent and Trademark Office* c) a diffusion tube having a tube length and distal ends, said diffusion tube surrounding said LED light strip;

d) an end cap integrated with each distal end, each said end cap having two electrical connectors electrically connected to said LED light strip; and e) wherein said filament simulator circuit utilizes the ballast power to generate LED light.